Patented Dec. 8, 1931

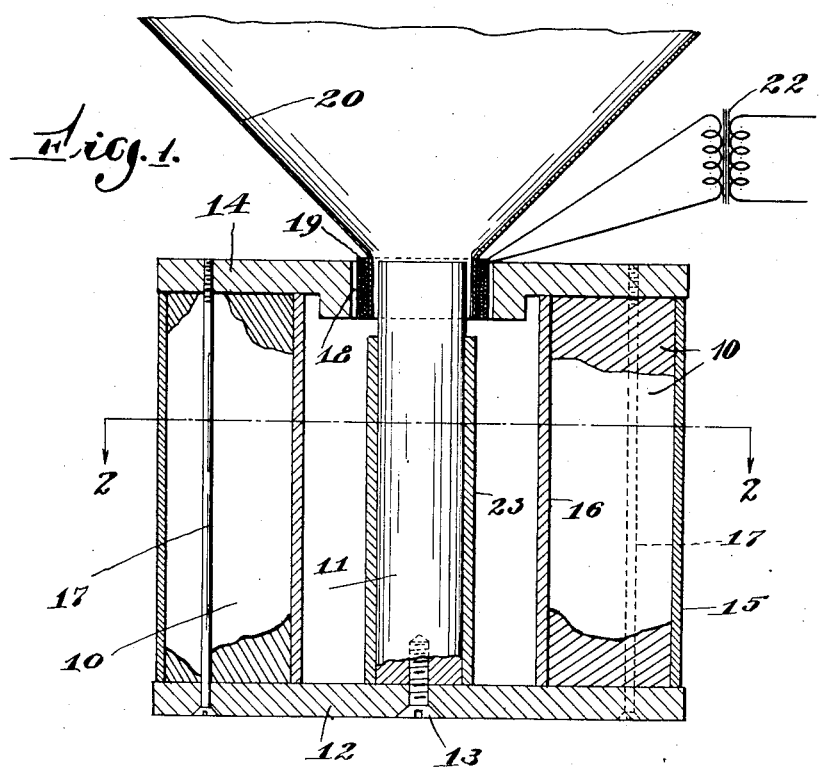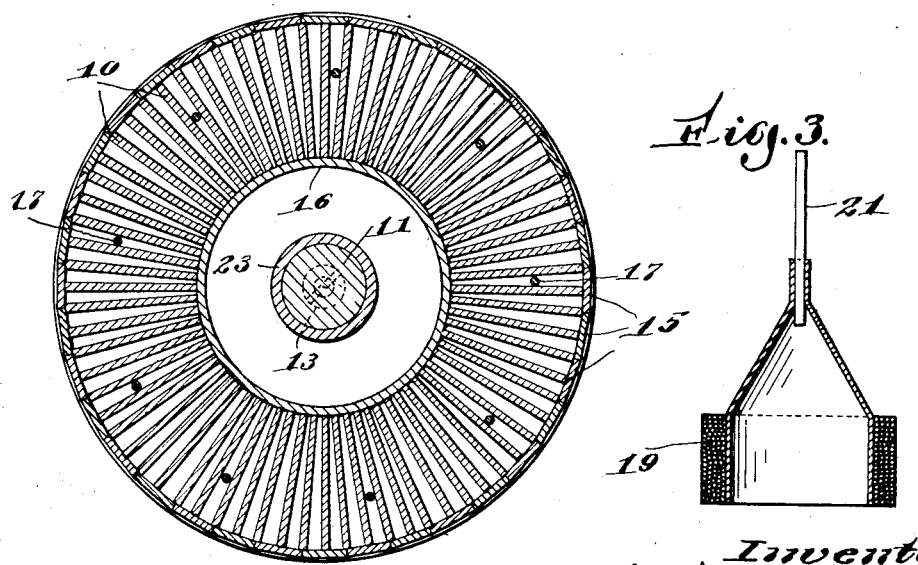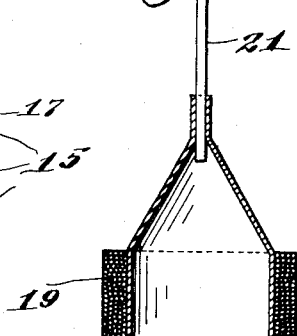

1,834,995

UNITED STATES PATENT OFFICE

WALTER H. BATHRICK, OF BOSTON, MASSACHUSETTS

DYNAMIC SPEAKER

Application filed July 29, 1929. Serial No. 381,839.

My present invention relates to dynamic speakers, and more particularly to an improved permanent magnet assembly for use in dynamic speakers.

In my present invention, a plurality of thin strip or permanent bar magnets are arranged in cross-section as an outer magnetic ring, which produces an intense field in a central core of great permeability, and permits the use of a circular air gap of much less circumference than in any design using U shaped magnets arranged around a central section. The smaller air gap permits a smaller moving coil to be used with less weight and less resistance in a more intense field.

In the present type of magnet the edges of the strip magnets are placed against a circle three inches in diameter, for instance, and over nine lineal inches of strip or bar permanent magnets may be used to produce a field of great permeability which is concentrated in the central core.

I am aware that a strong field for a moving coil may be obtained from any outside source of electrical energy, but a rectifier with usually an extra transformer is required, and if best results are desired, a storage battery should be included.

The principal object therefore, is an improved permanent magnet for dynamic speakers, or the like.

Another object is to obtain a very powerful magnetic field without increasing the fluctuations and hum, and at the same time maintain a uniform field consistent with storage battery operated dynamic speakers.

Other objects and novel features comprising the construction and operation of my device, will be apparent as the description of the invention progresses.

In the drawings illustrating my invention,

Fig. 1 shows a typical central cross section taken through the center of the device, the central core being partially in elevation;

Fig. 2 is a cross section taken on the line 2—2 of Fig. 1, and

Fig. 3 shows a cross section of another type of coil which may be attached to a different type of diaphragm.

Referring to the drawings, 10 indicates a series of permanent strip magnets radially disposed to form a circular magnetic ring about a core 11 which is of great permeability and is centrally located on a disc 12 of the same permeability and held thereto by a screw 13. The disc 12 is also in contact with the strip magnets 10. The ends of the magnets 10 are opposite in polarity to the adjacent portions of the disk 12, the center of such disk being reversed in polarity with respect to said magnet ends. Likewise, the end of the core 11 adjacent the center of the disk 12 has an opposite polarity to center of disk 12. A disk 14 located at the upper ends of the strip magnets 10 is reversed in polarity with respect to the disk 12, the upper ends of the strip magnets 10 having an opposite polarity to the bottom ends adjacent the disk 12. An outer ring of vertically disposed strip magnets 15 surround the outer edges of the strip magnets 10, and an inner tube 16 engages the inner edges of the magnets 10. If desired, the inner tube 16 may be composed of strips similar to members 15, and members 15 may be substituted for by a large tube similar to tube 16, or both inner and outer enclosing elements 16, and 15 may be similar in composition. Suitable connecting rods, as shown at 17, may be screwed into the disc 14 to bind the structure together, and are composed of non-magnetic metal.

At 18, in the central portion of the disc 14, I have provided an opening 18 in which is disposed the moving coil 19 which may be attached to a cone 20 as shown in Fig. 1, or to a needle 21, as shown in Fig. 3, and composed of a series of turns of wire, the ends of which connect with any suitable transformer 22, usually known as output transformers located in the radio set proper. Likewise, members 15 and 16 are not absolutely essential to the successful operation of the device, merely increasing its magnetic strength.

An additional permanent magnet 23 comprising a tube may be attached to the core 11 if desired to increase the field, although it is not essential to the successful operation of the device.

In Figs. 1 and 2, the confining rings of the device illustrated at 15 and 16 can be made of solid permanent magnets, or of very thin strip permanent magnets attached to non-magnetic material, or tubes that can be permanently magnetized may be used, but said confining rings 15 and 16 should not be made of metal of great permeability, because said rings if so made would establish a magnetic circuit between the poles of the magnets 10 and would therefore lessen the field across the air gap located between the inner edge of the opening 18 of the upper disc 14 and the top of the core 11.

It will be seen therefore, that when the outer ring magnets 15, spacing magnets 10, together with the inner tube 16, are made and arranged such that they have the same polarity with respect to their ends, the result is a series of magnets radially disposed about the core 11.

Having thus described my invention, what I claim as new, is:

1. In a dynamic speaker, a top and bottom disk of opposite polarity, a core attached to the bottom disk, the attached end having a polarity opposite to the center of the disk to which it is attached, the other end of said core being centrally located in an opening provided in said top disk and having a polarity opposite to that of the attached end, a series of radially disposed permanent magnets located between said discs composed of flat bar material, an inner ring of tubular construction comprising a permanent magnet adjacent the inner edges of said flat bar magnets, an outer ring of flat bar magnets surrounding and contacting the outer edges of said radially disposed bar magnets, means for binding the said magnets between the said discs, substantially as shown and described.

2. In a dynamic speaker, a plurality of strip magnets disposed radially about a centrally located permeable core, said core being oppositely polarized from adjacent portions of said strip magnets, said core being in contact at one end with a permeable plate, a second permeable plate oppositely polarized from said first plate and having an air gap between said second plate and the other end of said core, said strip magnets being located between the said plates, means for holding said strip magnets in contact with said plates and means for attaching said core to one of said plates.

3. A composite magnet comprising, two parallel permeable plates, a permeable core attached to the central portion of one of said plates, an air gap separating the opposite end of said core from the other plate, said air gap comprising an opening in the central portion of said other plate, said two plates being oppositely polarized with respect to each other for the purpose of creating a magnetic flux current therebetween, strip magnets located between said plates and about said core, the ends of said magnets contacting with said plates being oppositely polarized to said contacting plates.

4. In a dynamic speaker, a composite magnet comprising two permeable plates, a permeable core attached to the central portion of one plate, an opening located in the central portion of the other plate to receive the other end of said core with an air gap between, strip magnets separating said two plates and arranged radially around the core and spaced therefrom, the contacting surfaces of the said plates, magnets, and core having opposite polarities, an inner and outer magnetic tube connecting the said plates and joining the inner and outer edges of said strip magnets, and means for holding said members together, substantially as shown and described.

In testimony whereof I have affixed my signature.

WALTER H. BATHRICK